Sept. 15, 1942.   H. WAGNER   2,296,006
DRIVING MEANS FOR MECHANISMS FOR MULTIMOTORED AIRPLANES
Filed Feb. 23, 1940   3 Sheets-Sheet 1

Inventor
Herbert Wagner
by Grant Baldwin
Attorney.

Sept. 15, 1942.  H. WAGNER  2,296,006
DRIVING MEANS FOR MECHANISMS FOR MULTIMOTORED AIRPLANES
Filed Feb. 23, 1940  3 Sheets-Sheet 2
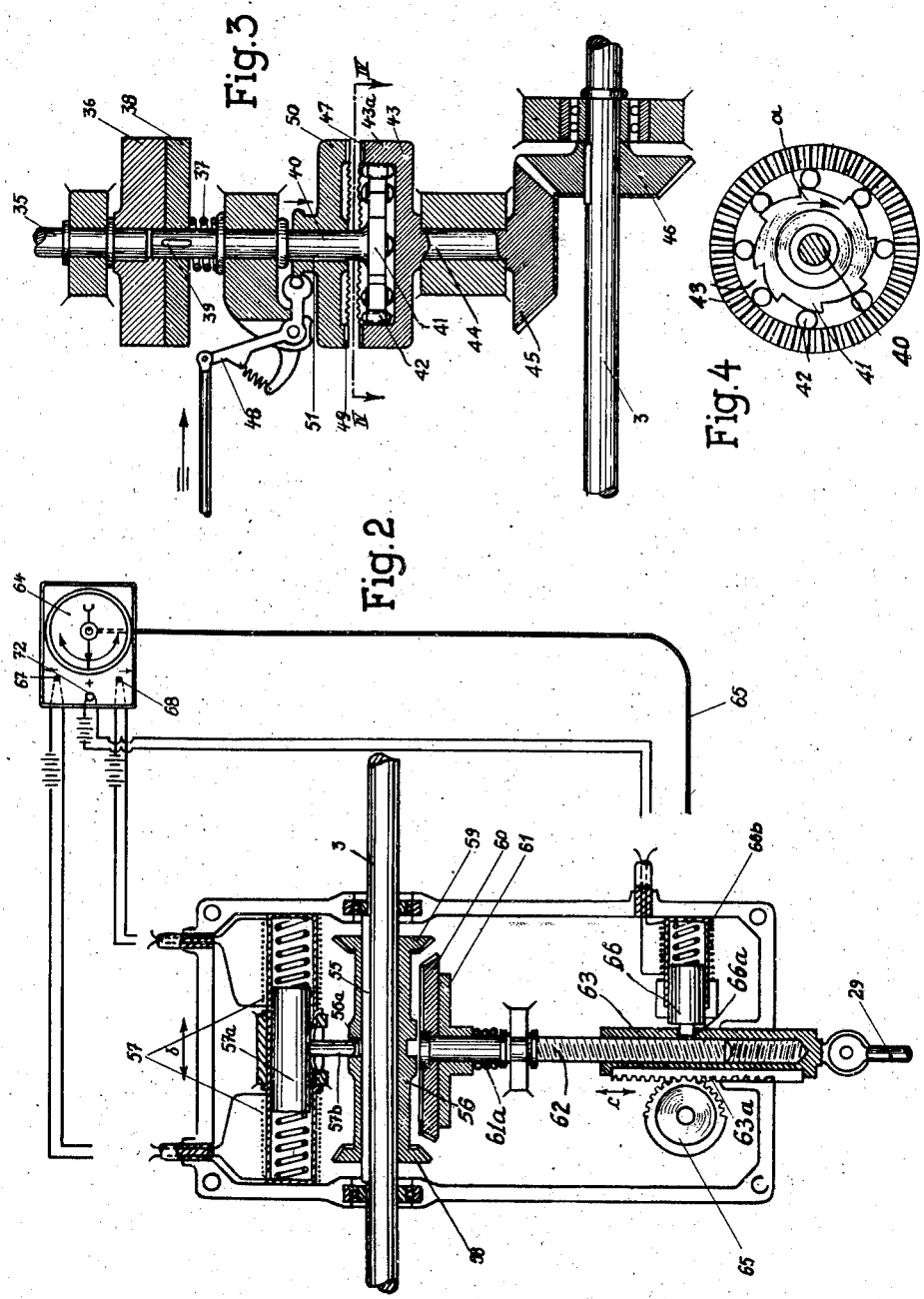
Inventor
Herbert Wagner
Attorney.

Sept. 15, 1942.    H. WAGNER    2,296,006
DRIVING MEANS FOR MECHANISMS FOR MULTIMOTORED AIRPLANES
Filed Feb. 23, 1940    3 Sheets-Sheet 3
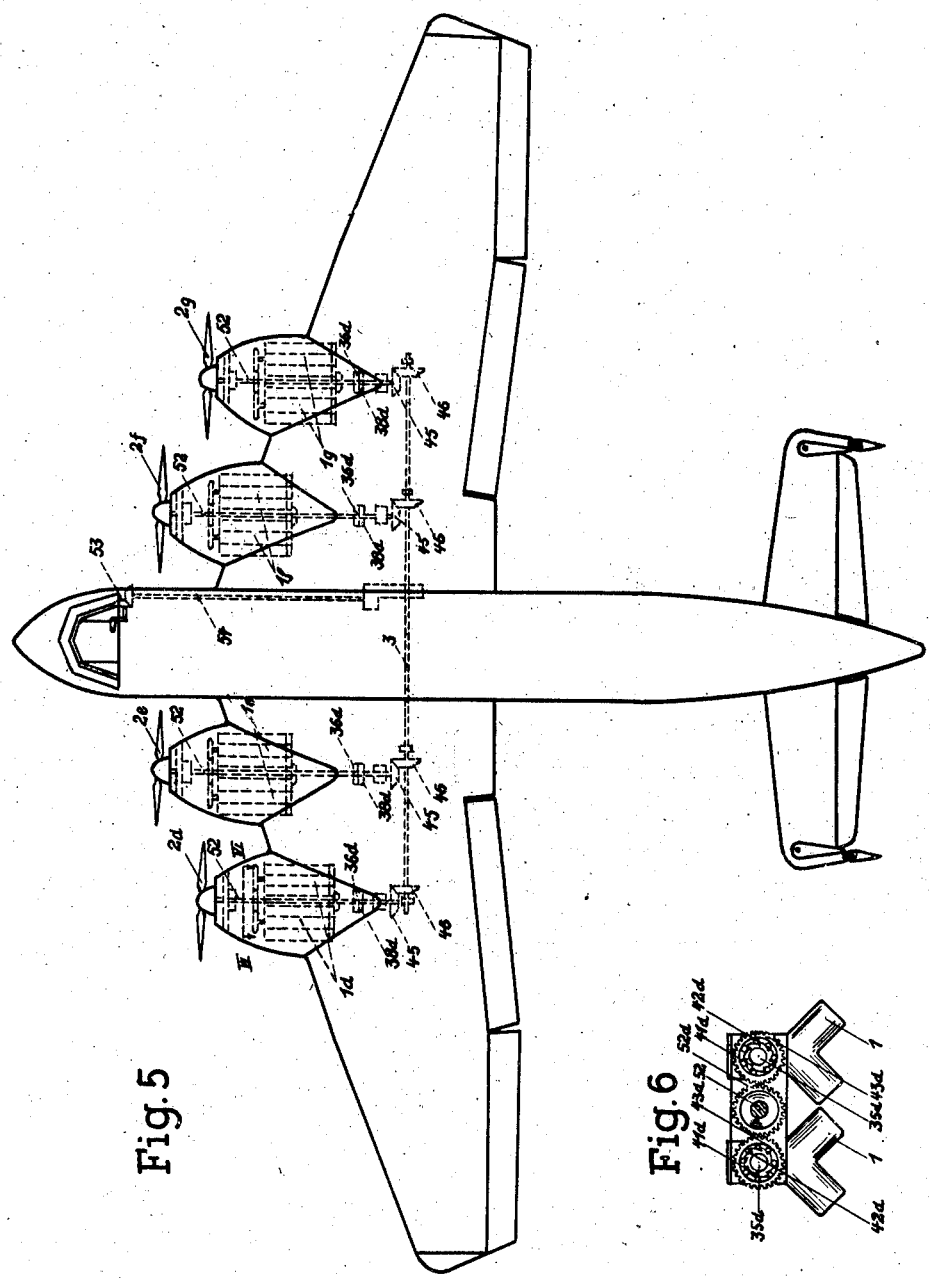

Patented Sept. 15, 1942

2,296,006

UNITED STATES PATENT OFFICE 2,296,006

DRIVING MEANS FOR MECHANISM FOR MULTIMOTORED AIRPLANES

Herbert Wagner, Berlin, Germany; vested in the Alien Property Custodian

Application February 23, 1940, Serial No. 320,404
In Germany November 28, 1938

4 Claims. (Cl. 244—53)

This invention relates to improvements in driving means for mechanisms on multi-motored airplanes, and refers particularly to a driving means whereby all the various mechanisms, such as electric generators, blowers, pumps, and moving parts such as flaps, elevators, landing gear and the like may be selectively driven by any one or all of the airplane motors.

At the present time it is customary to operate many of these mechanisms by means of electric, hydraulic, or pneumatic motors, and in order to insure a continued and uninterrupted source of power in the event of failure of one or more of the airplane motors it has hitherto been customary to provide a plurality of power generators each operated by a different motor. Not only has this necessitated a great duplication of generators, but it has also involved the use of a considerable amount of duplicate wiring, piping and operating mechanism. This has not only rendered the installation very complex and maintenance work tedious and difficult, but has added very materially to the weight of the airplane.

It is an object of the present invention to provide a driving means for mechanisms on multi-motored airplanes including a common shaft by which all the various mechanisms are adapted to be driven, and means co-operating with the shafts of the airplane motors whereby the common shaft may be driven by any one or all of the said airplane motors. Thus I aim to provide a driving means whereby the duplication above referred to may be safely eliminated, installation and repair work materially speeded and simplified, and the weight of the airplane vastly reduced. At the same time the arrangement is such that so long as a single airplane motor is in operation all the mechanisms may be operated as desired.

Another object of the invention is to provide a driving means for mechanisms on multi-motored airplanes including an overrunning clutch arranged between each airplane motor and the common shaft so that rotation of the latter is not impeded by the slower running, or stopping, of one or more of the motors.

A further object of the invention is to provide such a driving means for mechanisms on multi-motored airplanes including means adapted to turn the propeller on a motor which has stalled from the common shaft if desired. For instance if one of the outside motors fails just prior to landing a better landing can be made by operating the propeller driven by the dead motor.

Yet another object of the invention is to provide such a driving means for mechanisms on multi-motored airplanes including a means for preventing the overloading of any one of the airplane motors still in operation in the event that the other motors fail and the entire load of operating a plurality of mechanisms and perhaps the rotation of other propellers is thrust thereon.

Another object of the invention is to provide such a driving means for mechanisms on multi-motored airplanes including a mechanism connected to each propeller shaft whereby the propeller thereon may be rotated from the common shaft without turning the motor by which that propeller is normally driven, thereby reducing the load on the motor, or motors, which continue to function.

Having thus briefly stated some of the major objects and advantages of the invention I will now proceed to describe it in detail with the aid of the accompanying drawings, wherein:

Figure 2 is an enlarged detail showing a portion of the common shaft which is adapted to be driven by any one or all of the airplane motors, and one of the drive mechanisms operated by the common shaft.

Figure 3 is an enlarged detail showing the drive from one of the airplane motor shafts to the common shaft.

Figure 4 is a section on the line 4—4 of Figure 3.

Figure 5 is a plan view of a multi-motored airplane showing a modification wherein an overrunning clutch is provided between each motor and its propeller, and Figure 6 is a detail showing the overrunning clutch arrangement employed in Figure 5.

Figure 1:
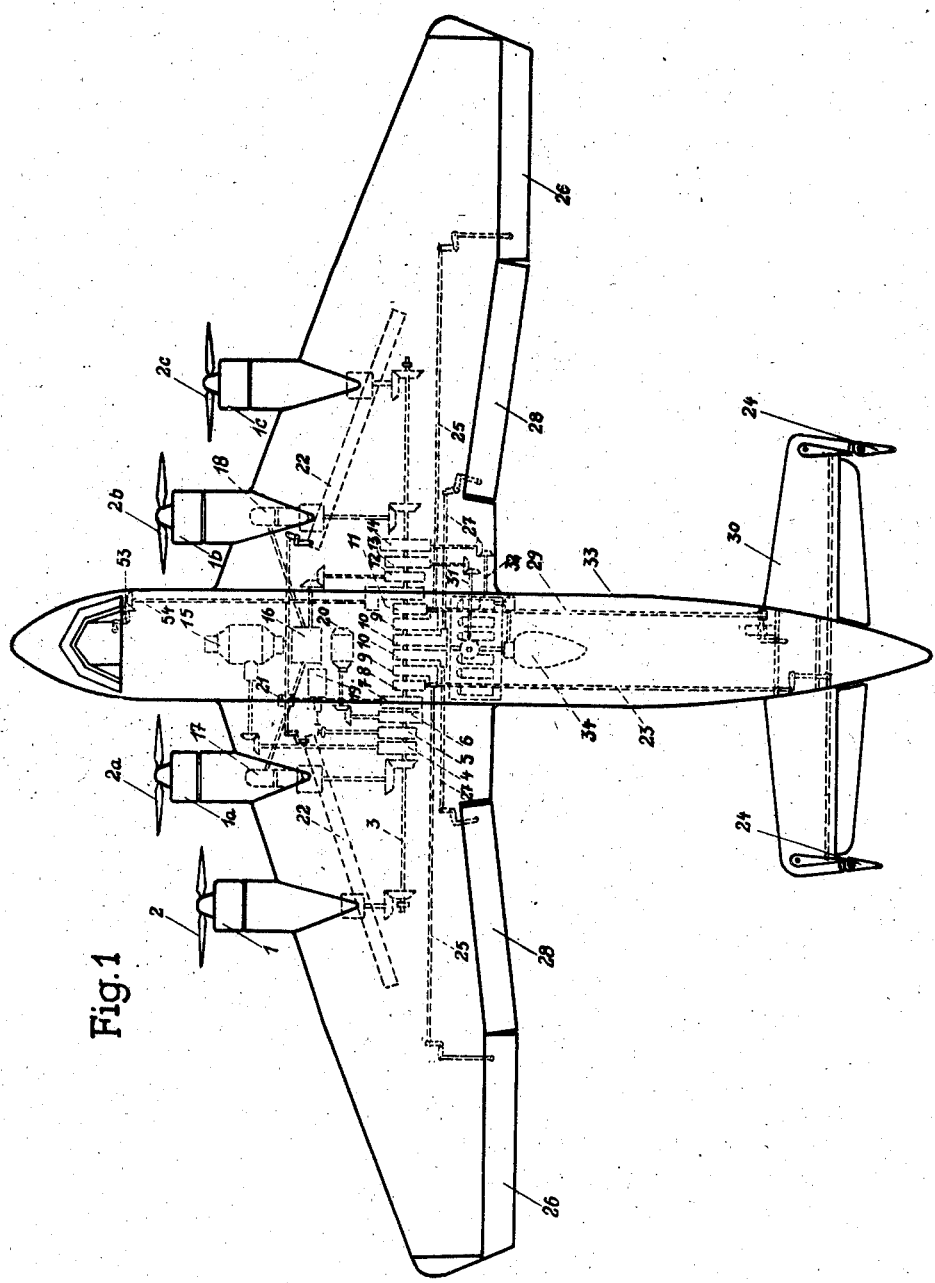
Figure 1 illustrates a plan view of a multi-motored airplane equipped with the invention.

The airplane is equipped with motors 1, 1a, 1b and 1c, each of which drives a propeller 2, 2a, 2b and 2c respectively, and are also adapted to operate a common shaft 3. Operated by the latter are a plurality of driving units, 4, 5, 6, 7, 8, 9, 10, 11, 12, 13 and 14, through each of which a separate mechanism is adapted to be actuated. The driving unit 4, through suitable connecting means operates a blower 15 which may be utilized for exhausting air from the skin layer. The drive unit 5 operates a fuel pump 19; the unit 6 is connected to an electric generator 20; the unit 7 to a mechanism 21 through which diving brakes are operated; the unit 8 is connected to a mechanism for operating rudders 24; the units 9, two of which are shown, are each connected to a mechanism 25 for operating one of the rudders 26, the units 10, two of which are employed in this case, are each connected to a mechanism 27 for operating the flaps 28; the unit 11 is connected to a mechanism 29 for operating the elevators 30; the unit 12 operates a mechanism 16 for actuating the landing gears 17 and 18; the unit 13 operates a mechanism 31 for releasing bombs; and the unit 14 is connected to a mechanism 32 for moving a gun mounting 34 to operative position relative to the fuselage 33.

Since the connection between each motor shaft 35 and the common shaft 3 is the same I will now describe one such connection with the aid of Figure 3. Secured on the motor shaft 35 is a friction disc 36 against which a corresponding disc 38 is held by a spring 37. The disc 38 is keyed at 39 to a shaft 40 whereon it is permitted axial movement. Such friction driving means as the coacting discs 36 and 38 effectively prevents too much power being drawn from the motors if sudden heavy loads are thrown onto the shaft 3. This is particularly of importance in cases where automatic variable pitch propellers are employed. Fixed on the shaft 40 is a ratchet wheel 41 around which the annular flange 43a of a locking disc 43 is spaced. Between the periphery of the ratchet wheel 41 and the said flange a plurality of rollers 42 are provided so that these coacting parts form an overrunning clutch. Integral with the disc 43 and coaxial with the shaft 40 is a stub shaft 44 fixed upon which is a gear 45 which meshes with a gear 46 on the common shaft 3. Thus rotation of the motor shaft 35 drives the shaft 40, and rotation of the latter and the ratchet wheel 41 in the direction of the arrow $a$ causes the rollers 42 to move outwardly into frictional engagement with the bore of the flange 43a so that the latter is rotated. Then the common shaft 3 is turned through the gearing 45 and 46. However if the motor shaft 35 is stationary, or is turning relatively slower than the common shaft 3 the ratchet wheel 41 is rotated slower than the locking disc 43 and consequently the latter is not frictionally engaged by the rollers 42.

If, however, the motor stalls and it is desired to drive the propeller normally driven by that motor from the common shaft 3 this can be accomplished in the following manner: A clutch 50 is keyed at 51 on the shaft 40 but is permitted axial movement thereon. This clutch member is provided with an annular flange 49 having radial teeth or serrations thereon adapted to engage corresponding teeth or serrations on the opposed face of the annular flange 43a. A conventional yoke and lever arrangement generally designated by the numeral 48 is provided for moving the member 50 axially and bringing its teeth or serrations into or out of engagement with the corresponding teeth or serrations of the disc 43. Obviously when they are engaged the shafts 40 and 44 are connected so that rotation of the latter by the common shaft 3 imparts rotation to the former. In this manner rotation may be imparted to any of the propellers so long as one motor continues to run.

In the arrangement shown in Figures 1 and 3 the clutch mechanism is provided between the common shaft 3 and each motor 1, 1a, 1b and 1c, so that when it is desired to rotate a propeller from the common shaft the motor by which that propeller is normally operated must also be turned. However in the modification shown in Figure 5 this is not the case. In that view the motors 1d, 1e, 1f and 1g, while of conventional design, include the use of two spaced, parallel motor shafts 35d. Each of the latter has a ratchet wheel 41d fixed thereon which is adapted to drive a concentric ring gear 43d through rollers 42d when turned in one direction. Each pair of gears 43d meshes with a gear 52d fixed on one of the propeller shafts 52. Each shaft 52 is split intermediately of its length and the adjacent split ends are provided with coacting friction clutch parts 36d and 38d, and the extremity of each shaft 52 remote from the propeller has a gear 45 fixed thereon which meshes with a gear 46 on the common shaft 3. Thus when the shaft 52 is driven by the common shaft rotation of the motor shaft 35d does not occur.

From the foregoing it will be seen that the various mechanisms remain operable through the common shaft 3 so long as one motor continues to function. However if all the motors fail the common shaft 3 may still be turned through suitable manual means, as through the crank 53 and the shaft 54, to operate one or more of the mechanisms.

Any preferred form of coupling means may be incorporated in each of the driving mechanisms 4, 5, 6, 7, 8, 9, 10, 11, 12, 13 and 14 for imparting rotary movement therethrough from the common shaft 3. One form of coupling arrangement is illustrated in Figure 2 which is shown connected to the elevators 30. On the common shaft 3 a sleeve 56 is keyed at 55 for axial movement thereon. Parallel with the shaft 3 a double-acting solenoid 57 is mounted, through which a plunger 57a is adapted to move axially in either direction as indicated by the arrows $b$, and extending from the plunger 57a intermediately of its length is a laterally disposed pin 57b which engages an annular groove 56a in the sleeve 56 so that when the solenoid is energized and the plunger 57a moved in either direction through suitable switch mechanism 67 or 68, one of the gears 58 or 59 fixed on the sleeve 57 engages a gear 60 on the spindle 62 and drives the latter in one direction or the other. A spring 61a around the spindle 62 coacts with a friction plate 61 which tends to retain the gear 60 in position to mesh with one of the gears 58, or 59, however this spring pressed plate 61 allows the gear 60 to move out of mesh with either gear 58 or 59 in the event that too great a resistance is offered to the drive provided by either of these gears. The opposite extremity of the spindle 62 is threaded to engage a nut 63 having a rack 63a formed longitudinally along one side thereof. This rack is engaged by a partial gear 65 which is rotatably mounted and is connected to a flexible shaft 65a by the rotation of which a pointer in a gauge 64 is operated to indicate the position of the elevators 30 connected to the shaft 29. Formed radially in the nut 63 is an aperture 66a to receive a spring pressed lock 66 which engages the latter when the said nut and the lever 29 are in mid or neutral position. This lock is axially movable in a solenoid 66b which is energized through suitable connections and switch mechanism indicated at 72.

To raise or lower the elevator 30, the lock 66 is first withdrawn from the nut 63 by operating the solenoid 66b through the switch mechanism 72, then one of the switches 67 or 68 is closed to energize one end or the other of the solenoid 57 and move the plunger 57a in the desired direction. By this movement one of the gears 58 or 59 is moved into engagement with the gear 60. Then the spindle 62 is turned and the nut 63 moved axially, since it is held against rotation by engagement of the partial gear 65 with the rack 63a.

While in the foregoing the preferred embodiments of the invention have been described and shown, it is understood that further alterations and modifications may be made thereto provided the said alterations and modifications fall within the scope of the appended claims.

What I claim is:

1. A driving means of the character described comprising a multi-motored airplane, a propeller shaft for each motor to be driven thereby through a means including overrunning clutch, a common shaft, overrunning clutches for driving the latter from each respective propeller shaft, a plurality of different mechanisms each to perform a separate function upon the airplane, a plurality of separate driving units one connected to each mechanism, means for disengageably coupling each driving unit with the common shaft for actuation thereby, and separate means for rendering individually inoperative the overrunning clutch between each propeller shaft and the common shaft whereby each propeller shaft may be directly driven by the common shaft in the event of failure of the motor associated with that propeller shaft.

2. The mechanism described in claim 1 wherein the means for disengageably coupling each driving unit with the common shaft includes selective means for determining the direction of actuation of said unit.

3. The mechanism described in claim 1 wherein the means for disengageably coupling each driving unit with the common shaft includes selective means for determining the direction of actuation of said unit together with a remote control for operating said selective means.

4. The mechanism described in claim 1 wherein the means for disengageably coupling each driving unit with the common shaft is associated with a friction drive whereby the common shaft may continue to operate if the driving unit is locked.

HERBERT WAGNER.